United States Patent
Grzeskowiak, II et al.

(10) Patent No.: US 11,485,045 B1
(45) Date of Patent: Nov. 1, 2022

(54) STONE SLABS, SYSTEMS, AND METHODS

(71) Applicant: Cambria Company LLC, Eden Prairie, MN (US)

(72) Inventors: Jon Louis Grzeskowiak, II, Prior Lake, MN (US); Martin E. Davis, Excelsior, MD (US)

(73) Assignee: Cambria Company LLC, Eden Prairie, MN (US)

(*) Notice: Subject to any disclaimer, the term of this patent is extended or adjusted under 35 U.S.C. 154(b) by 0 days.

(21) Appl. No.: 17/132,445

(22) Filed: Dec. 23, 2020

Related U.S. Application Data

(60) Provisional application No. 62/953,353, filed on Dec. 24, 2019.

(51) Int. Cl.
*B32B 9/00* (2006.01)
*B28B 1/00* (2006.01)
*B28B 11/00* (2006.01)
*B28B 11/10* (2006.01)

(52) U.S. Cl.
CPC ............ *B28B 1/008* (2013.01); *B28B 11/001* (2013.01); *B28B 11/10* (2013.01); *B32B 9/002* (2013.01); *B32B 2307/4026* (2013.01); *B32B 2307/414* (2013.01)

(58) Field of Classification Search
CPC .. B32B 9/00; B28B 1/00; B28B 11/00; B28B 11/10
USPC ........................................................ 428/213
See application file for complete search history.

(56) References Cited

U.S. PATENT DOCUMENTS

| | | | |
|---|---|---|---|
| 125,122 | A | 4/1872 | Davey |
| 3,518,146 | A | 6/1970 | Plympton |
| 4,209,486 | A | 6/1980 | Ross |
| 4,244,993 | A | 1/1981 | Platka |
| 4,254,019 | A | 3/1981 | Kroyer |
| 4,554,118 | A | 11/1985 | Seifert |
| 5,167,991 | A * | 12/1992 | Lowe ..................... B28B 11/00 427/270 |
| 7,001,660 | B2 | 2/2006 | Garitano |
| 8,702,886 | B2 | 4/2014 | Yaniv |
| 8,765,840 | B2 | 7/2014 | Busklia |
| 9,186,819 | B1 * | 11/2015 | Grzeskowiak, II ....... B44F 9/04 |
| 9,636,922 | B2 | 5/2017 | Hansson |
| 10,241,252 | B1 * | 3/2019 | Grzeskowiak, II ..... G09F 13/00 |
| 10,725,220 | B2 * | 7/2020 | Grzeskowiak, II ....... G09F 9/33 |
| 2006/0166002 | A1 | 7/2006 | Grey |

(Continued)

FOREIGN PATENT DOCUMENTS

WO    WO 1991014557    10/1991

OTHER PUBLICATIONS

ConcreteNetwork.com [online], "Concrete Countertop Inserts and Inlays", 2021 [retrieved on Mar. 22, 2021], retrieved from URL: https://www.concretenetwork.com/concrete/countertops/design-options/inserts-inlays.html, 12 pages.

*Primary Examiner* — Tahseen Khan
(74) *Attorney, Agent, or Firm* — Fish & Richardson P.C.

(57) ABSTRACT

This document describes systems and processes for forming stone slabs, which may be suitable for use in living or working spaces (e.g., along a countertop, table, floor, shower surrounds, tiles, or the like). In some embodiments, the stone slabs may be processed by partially filling a mold with a particulate mineral mix, and preparing a top surface of the particulate mineral mix to received one or more additional materials.

22 Claims, 8 Drawing Sheets

(56) References Cited

U.S. PATENT DOCUMENTS

2018/0126673 A1* 5/2018 Sanchis Brines ..... B29C 67/244
2019/0346610 A1* 11/2019 Grzeskowiak, II ....... G09F 9/33

* cited by examiner

STONE SLABS, SYSTEMS, AND METHODS

CROSS-REFERENCE TO RELATED APPLICATIONS

This application claims priority to U.S. Application Ser. No. 62/953,353, filed on Dec. 24, 2019, which is fully incorporated herein by reference.

TECHNICAL FIELD

This document describes systems and processes for forming stone slab products, for example, a processed stone slab that is thermoformed or otherwise compacted to a selected slab shape from a mixture including particulate mineral material, resin binder, and pigments so that the stone slab is suitable for use in living or working spaces (e.g., along a countertop, table, floor, or the like).

BACKGROUND

Stone slabs are a commonly used building material. Granite, marble, soapstone, and other quarried stones are often selected for use as countertops due to their aesthetic properties. Stone slabs may also be formed from a combination of natural and other materials that can provide improved qualities such as aesthetic characteristics, reproducibility, and stain-resistant or heat-resistant properties. Stone slabs have been made from a combination of particulate mineral material and binder, such as a polymer resin or cement. Some stone slabs are manufactured to have a particular aesthetic appearance, such as an aesthetic appearance that has a predetermined pattern or design, emulates quarried stone, or that accentuates particular aesthetic features.

SUMMARY

Some embodiments described herein include systems and processes for forming stone slabs suitable for use in living or working spaces. In particular embodiments, the stone slabs can be manufactured by dispensing material in a mold, performing one or more processing steps on the material, and subsequently dispensing additional material into the mold. For example, one or more particulate mineral mixes may be dispensed into a mold (e.g., such that an entire bottom of the mold or a portion thereof is covered by the one or more particulate mineral mixes). In some optional embodiments, the particulate mineral mix(es) in the mold may then be rolled, tamped, compressed, or otherwise at least partly compacted and/or smoothed. An additional material layer may then be dispensed into the mold. The slabs may be subsequently processed by compression molding and curing operations.

In various example embodiments, the additional material may be a pigmented material that contributes to the overall aesthetic appearance of the processed stone slab. The pigmented material may provide visible imagery (e.g., a reproduction of artwork, a graphic design, a photographic image reproduction, abstract patterns, words, logos, hand-printed text/graphics/symbols such as hand-printed name or initials, etc.), visible on a major surface of the stone slab. Alternatively or additionally, the pigmented material may provide the appearance of a vein or other aesthetic feature of the stone slab. For example, the pigmented material can contribute to complex striations and veining patterns of the stone slab. In some optional embodiments, the pigmented material is a particulate mineral mix.

Particular embodiments described herein include a process of forming a stone slab from different particulate mineral mixes. The process may include partially filling a mold with a particulate mineral mix to create a first layer of particulate mineral mix in the mold, preparing a top surface of the first layer of the particulate mineral mix for subsequent application of material to the top surface, applying a pigmented substance to the top surface of the first layer, and dispensing a second layer of particulate mineral mix into the mold over the applied pigmented substance.

In various implementations, the process can optionally include any one or more of the following features. Preparing the top surface of the first layer may include at least partially smoothing the top surface. Smoothing the top surface may include pressing or rolling the top surface. The pigmented substance may be applied to the top surface of the first layer while the first layer is in an uncured state. The second layer of the particulate mineral mix may be dispensed while the first layer is in an uncured state. The pigmented substance may be applied to provide an appearance of a predefined image. Partially filling a mold with particulate mineral mix to create a first layer may include entirely covering a bottom surface of the mold with the particulate mineral mix. The first layer and/or the second layer may be at least partly transparent or translucent when cured. The first layer may include a first particulate mineral mix and the pigmented substance may include a second particulate mineral mix, and the first particulate mineral mix may be differently pigmented than the second particulate mineral mix. The first particulate mineral mix may include predominantly quartz, and the pigmented substance is not predominantly quartz.

Various embodiments described herein include a stone slab. The stone slab includes a bottom layer defined by a first particulate mineral mix; a pigmented layer defined by a pigmented material; and a top layer defined by a second particulate mineral mix. The pigmented layer is between the bottom layer and the top layer, and the top layer is at least partly transparent or translucent such that the pigmented layer is visible through the top layer. In some embodiments, the pigmented layer may touch or penetrate the top layer (for example, by polishing or planing the top surface such that portions of the top surface are removed).

In various implementations, the process can optionally include any one or more of the following features. The pigmented material may provide a visible image. The pigmented material may not include a particulate mineral mix. A thickness of the pigmented layer may be less than 10% of a thickness of the top layer. The second particulate mineral mix may be predominantly quartz.

Various embodiments described herein include a system for forming a stone slab using a combination of different particulate mineral mixes. The system includes a slab mold defining a mold space; a first dispenser configured to dispense a particulate mineral mix; a surface preparation device configured to smooth a top surface of particulate mineral mix within the slab mold; a second dispenser configured to dispense pigmented substance onto the top surface; and a third dispenser configured to dispense particulate mineral mix into the slab mold.

In various implementations, the process can optionally include any one or more of the following features. The surface preparation device may be configured to at least partially compress the top surface. The second particulate mineral mix may be at least partly transparent or translucent when cured. The second dispenser may be configured to apply the pigmented substance such that the pigmented substance provides a predetermined image or pattern on the top surface.

The systems and techniques described here may provide one or more of the following advantages. First, stone slabs described herein can include a visible image on a major surface of the stone slab. The image can enhance the aesthetic appearance of the stone slab by providing a predetermined image visible to an observer of the finished stone slab. In some embodiments, the stone slab may provide the appearance that the image is 'captured' or 'floating' within the thickness of the stone slab.

Second, stone slabs, systems, and methods described herein can provide an image having limited distortion and high fidelity. For example, an image can be reproduced on the surface of an uncured particulate mineral mix within a slab mold, and the appearance of the image can be controlled/retained during subsequent processing operations such that the image is visible in the finished slab with limited variation or distortion.

Third, stone slabs, systems, and methods, described herein can provide a plurality of stone slabs with a high degree of reproducibility. For example, a plurality of stone slabs may include the same predetermined visible image, pattern, etc. The predetermined visible image, pattern, etc. on each of the plurality of stone slabs may be substantially identical to an observer of the stone slabs Fourth, each slab in the system can be formed from a compression molding operation in which the molds containing the particulate mineral mixes are maintained in a horizontal orientation after the mold is filled. For example, particulate mineral mixes are distributed into the mold, imagery is applied to the surface, and a top layer is applied, then subsequent procession operations are performed (e.g., vibro-compaction molding, planing, polishing, curing, etc.).

Fifth, in various embodiments, stone slabs may be efficiently produced while having a high degree of customizability. Predetermined imagery may be applied to a layer of uncured particulate mineral mix in the mold to produce a stone slab having a desired appearance, before being at least partially covered by one or more additional layers of particulate mineral mix. The imagery may be a reproduction of artwork, a graphic design, a photographic reproduction, abstract patterns, words, logos, hand-printed text/graphics/symbols such as hand-printed name or initials, etc. that may be unique to a particular stone slab, or reproduced on a plurality of stone slabs.

Sixth, in some optional embodiments, delivery of material that contributes to a predetermined aesthetic appearance of the stone slab may be applied in a predictable and/or reproducible manner. For example, an intermediate surface is prepared in one or more operations such that an additional material may be applied to the intermediate surface in a predictable, reproducible manner. The intermediate surface may be prepared by rolling, tamping, compressing, or otherwise at least partly compacting and/or smoothing an uncured particulate mineral mix. The additional material may optionally be applied directly to the uncured particulate mineral mix, and subsequently covered by one or more additional particulate mineral mixes.

Seventh, in some embodiments, a layered stone slab may be formed by sequentially depositing multiple different materials into a horizontally-oriented mold. At least some of the materials extend across the entire length and width of the mold, such as a bottom layer that entirely covers a bottom surface of the mold and a top layer that has the same dimensions as the bottom layer. A resulting stone slab may have a series of sequentially-deposited layers having different visual characteristics that can be observed from a major surface of the slab. For example, a combination of multiple sequentially-deposited layers, and one or more translucent materials, may create a visual appearance such that an observer can see into a thickness of the slab to observe visual imagery or other layers within the slab.

The details of one or more implementations are set forth in the accompanying drawings and the description below. Other features and advantages will be apparent from the description and drawings, and from the claims.

DETAILED DESCRIPTION

Figure 1:
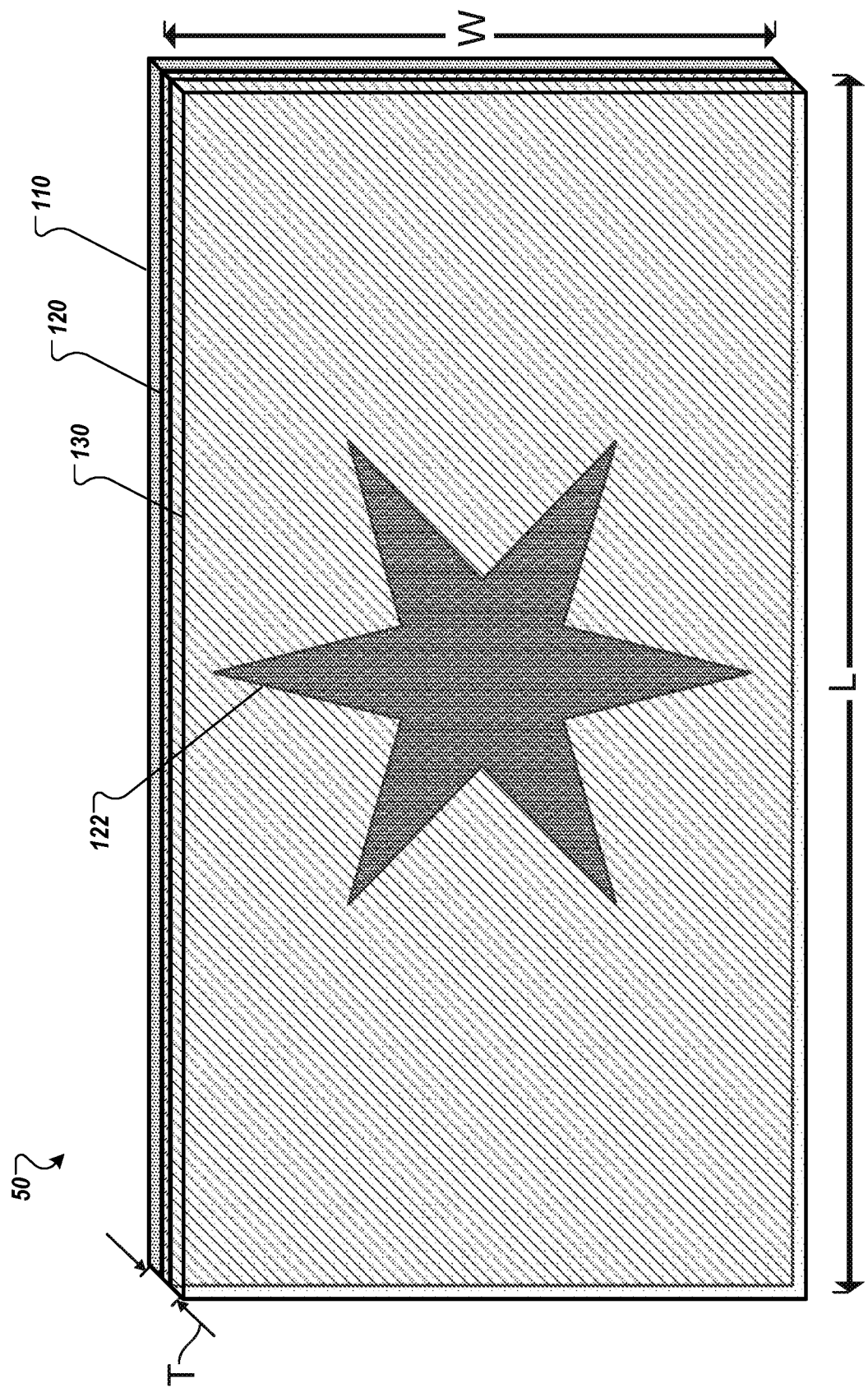
FIG. 1 is a perspective view of an example stone slab.

Referring to FIG. 1, an example stone slab 50 is shown that can include predefined visible imagery, striations, veins, etc. The stone slab 50 can comprise a quartz material and/or other particulate mineral material that, when mixed with pigments and a resin binder and compressed, provides a hardened slab product suitable for use in living or working spaces (e.g., along a countertop, table, floor, or the like). For example, the stone slab 50 can be formed from a combination of differently pigmented particulate mineral mixes and/or pigmented material layers that are distributed into a mold (e.g., sequentially dispensed into a horizontally-oriented mold), and subsequently vibrated/compacted and cured.

Stone slab 50 includes a bottom layer 110, top layer 130, and a pigmented material layer 120 that, in some embodiments, is at least partially between the bottom layer 110 and the top layer 130. The pigmented material layer 120 can contribute to the appearance of visible imagery of stone slab 50. For example, the pigmented material layer 120 includes a predetermined pattern 122, such as a reproduction of artwork, a graphic design, a photographic reproduction, abstract patterns, words, logos, hand-printed text/graphics/symbols such as hand-printed name or initials, etc. Alternatively or additionally, the pigmented material layer 120 can contribute to the appearance of striations, veining, etc. The pigmented layer 120 may include one, two, or more pigmented materials that are separately distributed into the mold (e.g., before the top layer 130 is applied).

The top layer 130 and/or the bottom layer 110 may be at least partly transparent or translucent such that the pigmented material layer 120 is visible through the top layer 130 and/or the bottom layer 110. In an example embodiment, the stone slab 50 provides an aesthetic appearance of the pigmented material layer 120 'captured' or 'floating' between the bottom layer 110 and the top layer 130. Such an effect can enhance the aesthetic appearance of the processed slab, and/or create a perception of durability against damage or wear to the pigmented material layer (e.g., because the pigmented material layer 120 has the appearance of being covered or encased in the top and bottom layers 110, 130). In an example embodiment, pigmented material layer 120 does not form a portion of an exposed surface of stone slab 50 (e.g., pigmented material layer 120 is completely covered by bottom layer 110 and/or top layer 130).

The pigmented material layer 120 may include multiple pigmented material layers (e.g., multiple pigmented material layers at least partially between bottom layer 110 and top layer 130). Alternatively or additionally, bottom layer 110 and/or top layer 130 may each include multiple material layers of the same or different material layers (e.g., distributed sequentially, differently pigmented, different composition, etc.).

In an example embodiment, stone slab 50 may be one of a plurality of stone slabs having a similar appearance. For example, bottom layer 110, top layer 130, and/or pigmented material layer 120 may be distributed and processed in a generally repeatable manner to produce a plurality of stone slabs 50 having the same visible imagery and same overall appearance.

In some example embodiments, the predefined pattern(s) of the pigmented material layer 120 are generally repeatable for a plurality of separately molded stone slabs 50. As described in greater detail herein, production of the stone slab 50 may include distributing bottom layer 110 into a mold, and at least partly pressing, rolling, tamping, compacting, and/or smoothing the bottom layer to provide a surface upon which the pigmented material layer 120 is applied. The top layer 130 is then distributed over the pigmented material layer 120, before the bottom layer 110, pigmented material layer 120, and top layer 130 are further processed (e.g., in one or more compaction, curing, polishing or other operations) to form the stone slab 50.

The bottom layer 110, pigmented material layer 120, and/or top layer 130 can include organic polymer(s) and an inorganic (mineral) particulate component(s). The inorganic (mineral) particulate component may include such components as silicon, basalt, glass, diamond, rocks, pebbles, shells, silica, a variety of quartz containing materials, such as, for example, but not limited to: crushed quartz, sand, quartz particles, and the like, or any combination thereof. In an example embodiment, each particulate mineral mixes that make up stone slab 50 include a quartz or silica material as a predominant component, which may include sand of various particle sizes and of different combinations. In the stone slab 50, the organic and inorganic materials can be linked using a binder, which may include for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. In various example embodiments, the bottom layer 110, the pigmented material layer 120, and the top layer 130, may include about 8%-95%, 25%-95%, or about 75-95% inorganic aggregates, and about 3%-50%, 5%-25%, or about 5%-15% polymer resins. In addition, various additives, may be added to the raw materials in the mixing apparatus, such additives may include, metallic pieces (e.g., copper or mirror flecks or the like), colorants, dyes, pigments, chemical reagents, antimicrobial substances, fungicidal agents, and the like, or any combination thereof. In various example embodiments, one or more layers (e.g., the pigmented material layer 120 may have no particulate material, such as about 0% inorganic aggregates).

In some example embodiments, the pigmented material layer 120 does not include a predominantly mineral mix. The pigmented material layer 120 may include a pigment material that does not include quartz or silica particulate, or only trace amounts of quartz or silica particulate.

The stone slab 50 may have a generally rectangular shape and be defined by a width W, length L, and thickness T. In some embodiments, the width W of the stone slab 50 is at least 3 feet, between about 3 feet and 18 feet, or between about 4.5 feet and 7 feet, and the length L of the stone slab 50 formed in the mold is at least 6 feet, and between about 6 feet and 24 feet, or between about 10 feet and 12 feet. In some embodiments, the thickness T of the stone slab 50 is at least 1 cm, between about 2.5 cm and 25 cm, or about 7.5 cm.

The thickness T of the stone slab may be defined by a thickness of the bottom layer 110, the pigmented layer 120, and/or the top layer 130. In an example embodiment, the thicknesses of the bottom layer 110 and the top layer 130 are each substantially greater than a thickness of the pigmented layer 120. For example, the thickness of the top layer 130 may be greater than the thickness of the bottom layer 110 and/or the pigmented material layer 120. Alternatively or additionally, the thickness of the bottom layer 110 may be greater than the thickness of the top layer 130 and/or the pigmented material layer 120. In some embodiments, a thickness of the pigmented layer 120 is less than 10% of a thickness of the top layer 130, such that the overall thickness of the stone slab 50 is substantially defined by bottom layer 110 and top layer 130, and pigmented layer 120 does not substantially contribute to the thickness of the stone slab. For example, the pigmented layer 120 may not be exposed anywhere around the perimeter of the stone slab 50. Such relative thickness can enhance the aesthetic appearance of stone slab 50, and/or provide a perception that the pigmented material 120 is 'floating' or 'captured' within stone slab 50. In some embodiments, the pigmented layer 120 may have a thickness that is greater than the thickness of the top layer 130 and/or the bottom layer 110.

The stone slab 50 may include a predetermined sequence of material layers. The bottom layer 110 and the top layer 130 may be any layers within the sequence of layers, and each may include one or more layers of particulate mineral mix and or other materials (e.g., distributed sequentially into a slab mold to form bottom layer 110 and/or top layer 130). In an example embodiment, the top layer 130 includes a top-most layer that defines an exposed surface of a countertop and the bottom layer 110 includes a bottom-most layer that defines an at least partly exposed bottom surface of a countertop. Alternatively or additionally, stone slab 50 may include one or more additional layers that at least partially cover bottom layer 110 and/or top layer 130 (e.g., such that the bottom layer 110 and/or top layer 130 are not exposed). In an example embodiment, the bottom layer 110 and the top layer 130 are on opposed sides of the pigmented layer 120, such that the pigmented layer is between or 'captured' by the bottom and top layers 110, 130. In some example embodiments, stone slab 50 may include two or more pigmented layers 120 separated by one or more intermediate layers. Such a construction can provide an appearance of the two or more pigmented layers 120 'floating' at different depths within the slab. Alternatively or additionally, a pigmented layer 120 may be applied to a mold (e.g., a pigmented layer 120 may be a first material layer distributed into the mold), and bottom layer 110 and/or top layer 130 may be distributed into the mold after and/or over the pigmented layer 120.

Figure 2A:
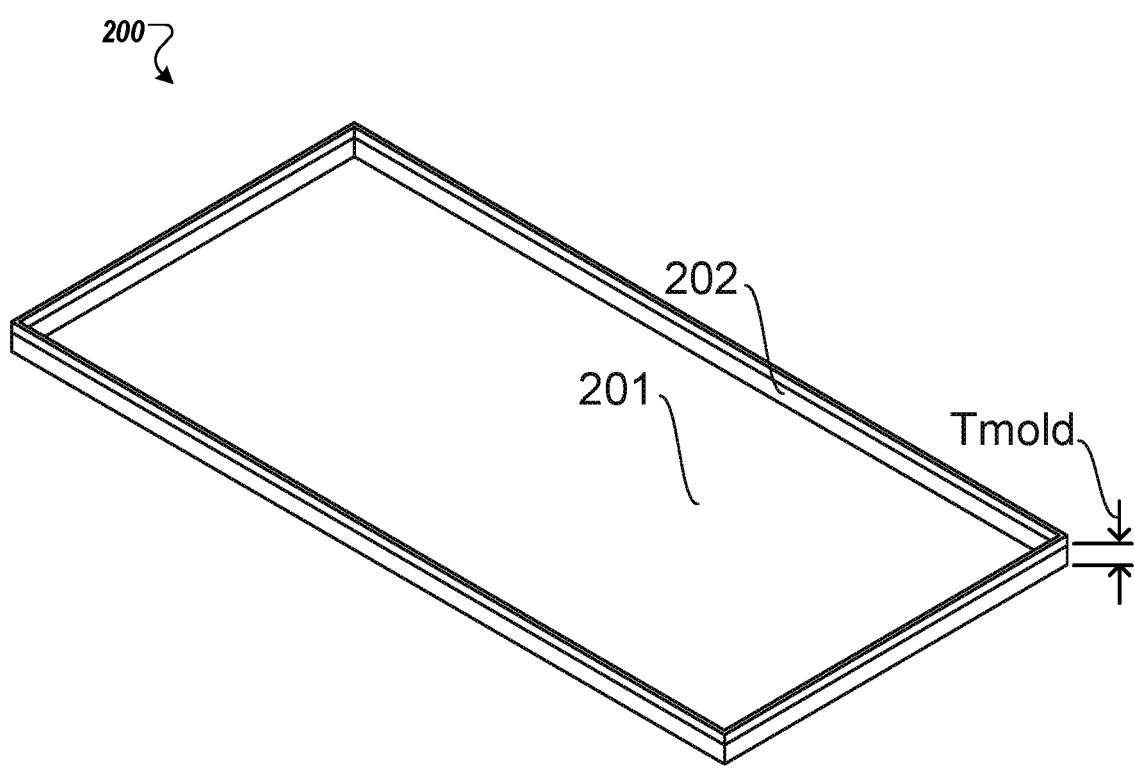
FIG. 2A is a perspective view of an example stone slab mold.

Referring now to FIG. 2A, a perspective view of an example slab mold 200 is shown. The slab mold 200 includes a bottom 201, one or more mold walls 202, and a thickness $T_{mold}$ (e.g., which optionally corresponds with a thickness of a stone slab formed using the slab mold 200). The slab mold 200 at least partially defines a cavity (e.g., defined by bottom 201 and walls 202) to receive particulate mineral mix distributed into the slab mold 200.

Figure 2B:
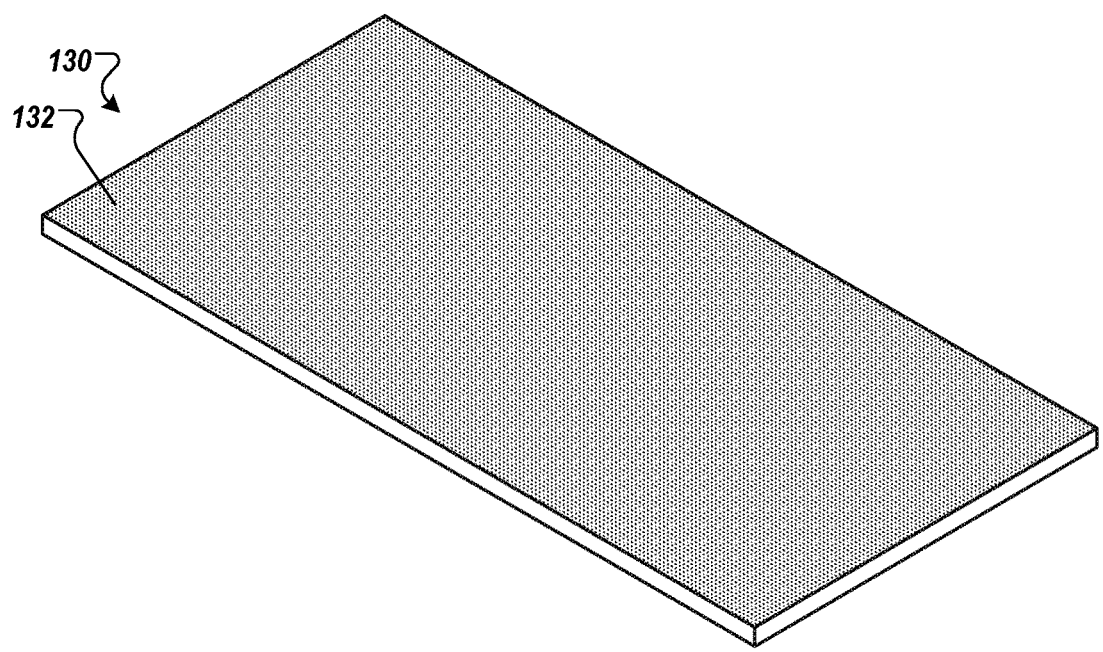
FIG. 2B is a perspective view of an example bottom material layer used to form the example stone slab of FIG. 1.
Figure 2C:
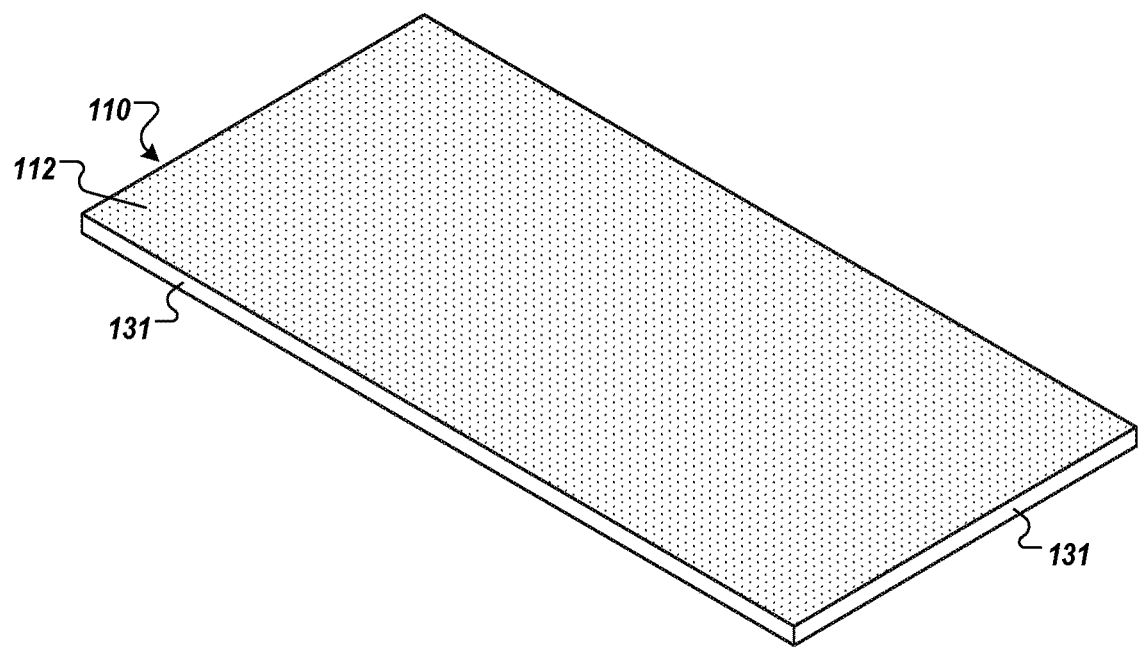
FIG. 2C is a perspective view of an example top material layer used to form the example stone slab of FIG. 1.

FIGS. 2B and 2C show perspective views of an example top layer 130 (FIG. 2B) and an example bottom layer 110 (FIG. 2C) are shown. In the view of FIG. 2C, bottom layer 110 is shown alone (e.g., in isolation from pigmented material layer 120, top layer 130, etc.). The bottom layer 110 can include a combination of differently pigmented particulate mineral mixes that are distributed into the mold 200 (e.g., while the mold 200 is horizontally oriented). The bottom layer 110 may cover an entire bottom of a slab mold (e.g., 201 of mold 200 shown in FIG. 2A). The material at least partially forming bottom layer 110 can be at least partly rolled, tamped, compressed, or otherwise at least partly compacted and/or smoothed during an intermediate processing operation (e.g., as discussed in further detail with reference to FIGS. 4-5) to provide a surface 112 upon which the pigmented material layer 120 can be applied. Materials of bottom layer 110 may be pre-mixed and distributed simultaneously into the slab mold 200. Alternatively or additionally, the bottom layer 110 may be formed from materials distributed sequentially into the slab mold 200, such as multiple different particulate mineral mixes sequentially distributed into the slab mold 200. In some embodiments, the bottom layer 110 may be formed with raised, three-dimensional features (e.g., ridges, textures, patterns). In some embodiments, the bottom layer 110 can be subdivided (e.g., split) to create multiple bottom layers that have similar (e.g., mirrored) appearances.

The bottom layer 110 may be formed such that the pigmented layer 120 and/or the predetermined pattern 122 is at least partly visible though the bottom layer 110 in the stone slab 50. In an example embodiment, the bottom layer 110 is a material that is at least partially transparent or translucent when fully processed/cured into the stone slab 50. For example, the bottom layer 110 may be formed of a predominately quartz particulate mineral mix having at least partially transparent particles that allow the pigmented layer 120 to be visible through the bottom layer 110. The material that forms the bottom layer 110 may have an opaque and/or white appearance when uncured or 'wet.' When in an uncured/intermediate state, the bottom layer 110 may substantially obscure or otherwise render the pigmented material layer 120 not visible or only slightly visible. The bottom layer 110 may transition from opaque to transparent/translucent during one or more curing operations such that the pigmented material layer 120 is readily visible through the bottom layer 110 in the stone slab 50.

In the view of FIG. 2B, top layer 130 is shown alone (e.g., in isolation from bottom layer 110, and pigmented material layer 120, etc.). The top layer is dispensed over a pigmented layer (such as a pigmented material layer 120 shown in FIG. 1). Materials of top layer 130 may be pre-mixed and distributed simultaneously into the slab mold 200. Alternatively or additionally, the top layer 130 may be formed from materials distributed sequentially into the slab mold 200, such as multiple different particulate mineral mixes sequentially distributed into the slab mold 200.

The top layer 130 may be formed such that the pigmented layer 120 and/or the predetermined pattern 122 is at least partly visible though the top layer 130 in the stone slab 50. In an example embodiment, the top layer 130 is a material that is at least partially transparent or translucent when fully processed/cured into the stone slab 50. For example, the top layer 130 may be formed of a predominately quartz particulate mineral mix having at least partially transparent particles that allow the pigmented layer 120 to be visible through the top layer 130. The material that forms the top layer 130 may have an opaque and/or white appearance when uncured or 'wet.' When in an uncured/intermediate state, the top layer 130 may substantially obscure or otherwise render the pigmented material layer 120 not visible or only slightly visible. The top layer 130 may transition from opaque to transparent/translucent during one or more curing operations such that the pigmented material layer 120 is readily visible through the top layer 130 in the stone slab 50.

Figure 2D:
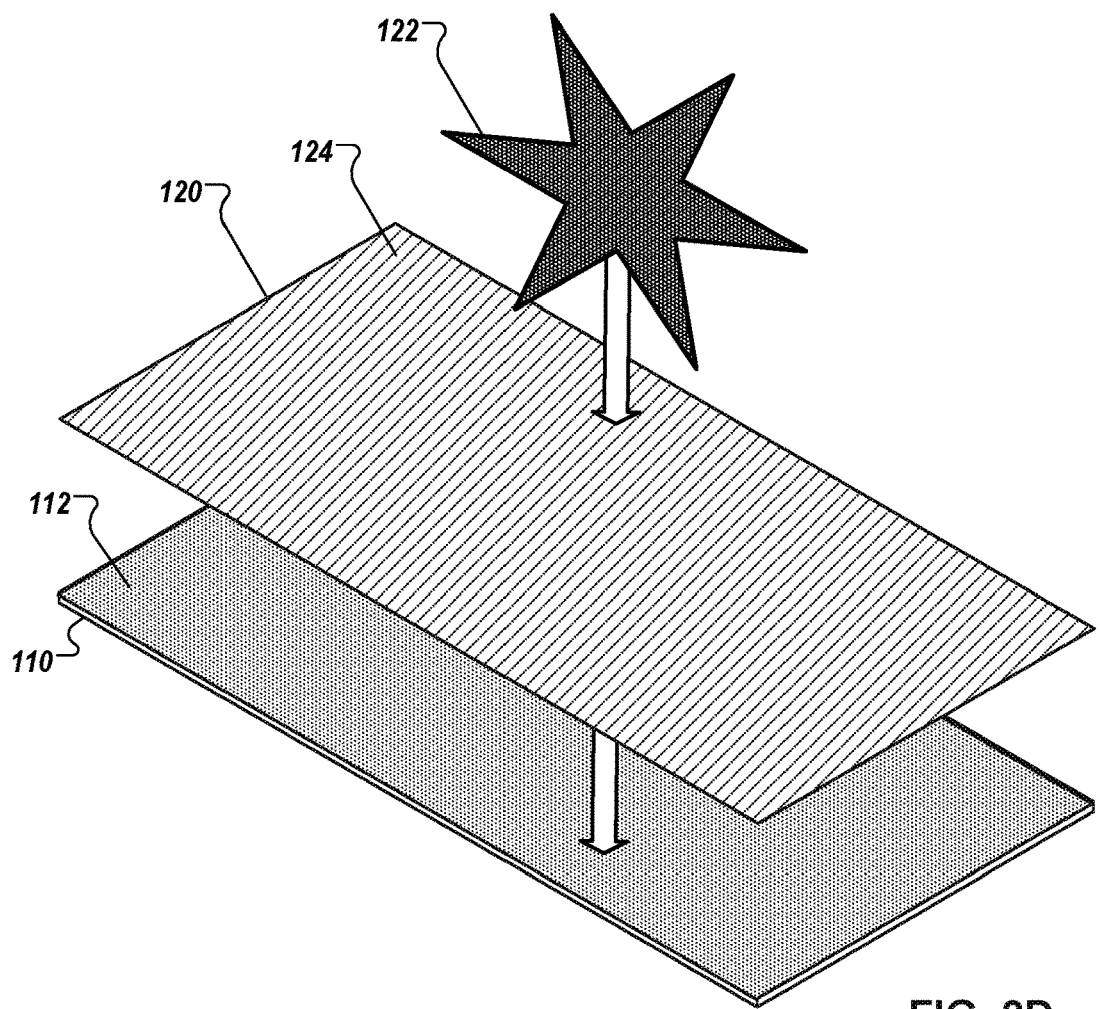
FIGS. 2D and 2E are exploded and perspective views of an example stone slab that includes a pigmented layer.
Figure 2E:
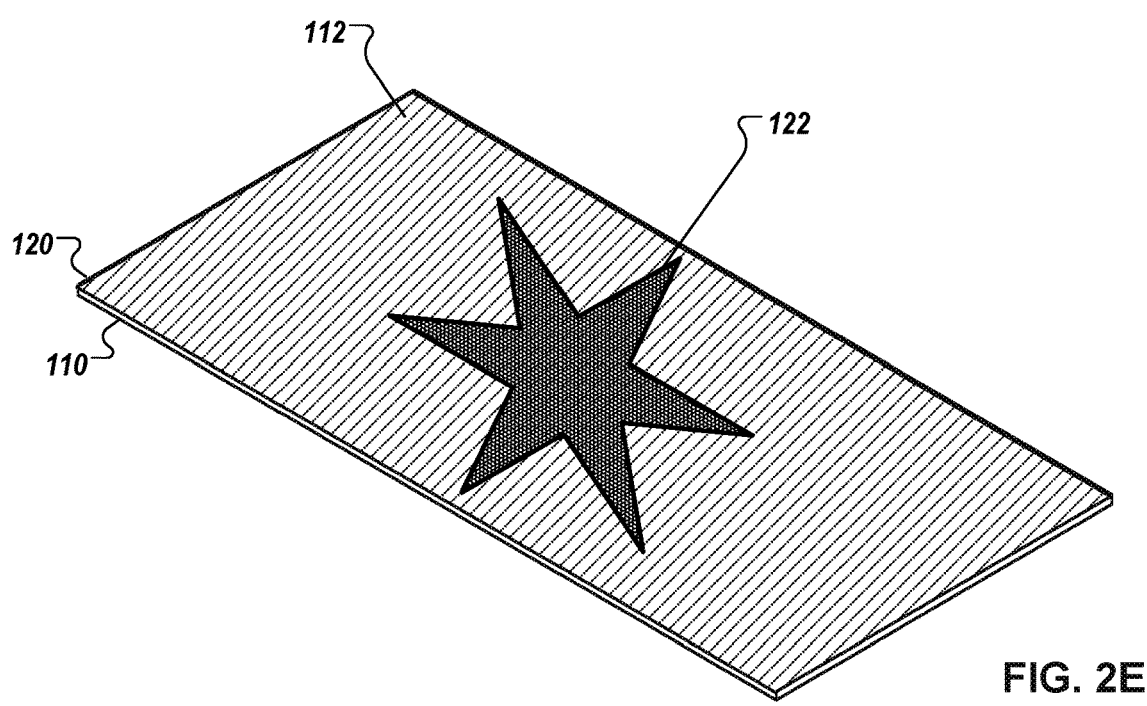

Referring now to FIGS. 2D and 2E, exploded and perspective views of example pigmented layer 120 and the bottom layer 110 are shown. In various example embodiments, the pigmented layer 120 includes multiple pigmented materials (e.g., multiple differently pigmented materials distributed simultaneously or sequentially), such as predetermined pattern 122 and pigmented portion 124. The predetermined pattern 122 can include any appropriate visual appearance, such as a reproduction of artwork, a graphic design, a photographic image reproduction, abstract patterns, words, logos, hand-printed text/graphics/symbols such as hand-printed name or initials, etc., and may be formed independently from pigmented portion 124, or formed partly or completely by pigmented portion 124.

In some example embodiments, the pigmented portion 124 of pigmented material 120 may provide a visual background for the predetermined pattern 122 and/or the pigmented portion 124 may at least partly form the predetermined pattern 122. For example, the pigmented portion 124 can provide a complimentary or contrasting color that enhances the aesthetic appearance of the predetermined pattern 122. In some embodiments, the pigmented portion 124 may contribute to, or provide, the appearance of a stained glass design. The pigmented portion 124 and the pigmented pattern 122 may each be directly applied to the bottom layer 110. Alternatively or additionally, the predetermined pattern 122 may be separated from the bottom layer 110 by pigmented portion 124. In some embodiments, the pigmented portion 124 can be a primer or other material that promotes the appearance and/or adhesion of the predetermined pattern 122 to the bottom layer 110 and/or the top layer 130.

In an example embodiment, pigmented layer 120 includes two parts that substantially cover the entire surface 112. In various example embodiments, the pigmented layer 120 can include one, two, three, ten, or any other appropriate number of pigments and/or portions. The pigmented layer 120 can cover all or less than all of the surface 112.

The pigmented layer 120 can be applied manually, or automatically (e.g., with limited or no manual manipulation of the pigmented material). For example, the pigmented layer 120 can be applied by hand (e.g., painted onto the surface 112 with an applicator, brush, spray device, etc.). Alternatively or additionally, the pigmented layer 120 can be applied by a machine such as printed, sprayed, silk-screened, or otherwise deposited on the surface 112. For example, the pigmented layer 120 may be distributed on the surface by a robotic printer head configured to move in a predetermined pattern over the surface of 112 to deliver the pigmented material in a controlled manner. Alternatively or additionally, a pigmented layer 120 may be distributed into the mold (e.g., applied to a mold surface) before distribution of bottom layer 110 and/or top layer 130. For example, a pigmented layer 120 may be distributed into the mold, followed by one or more additional layers, such as bottom layer 110 and top layer 130. One or more additional pigmented layers 120 may be distributed such that the one or more additional pigmented layers are located at least partially between bottom layer 110, top layer 130, and/or one or more additional layers. In some embodiments, outer surfaces of the stone slab may include pigmented layers 120 (e.g., such as a first pigmented layer 120 and a second pigmented layer 120 opposite the first pigmented layer 120, the first and second pigmented layers separated by bottom layer 110, top layer 130, and/or one or more additional material layers).

In some example embodiments, the pigmented layer 120 can include a film or membrane that includes the predetermined pattern 122. The film or membrane may be applied at least over a portion of the surface 112. In an example embodiment, the film or membrane is made of a material having a relatively high heat resistance sufficient to withstand subsequent processing operations with limited distortion or with predictable distortion, to provide a predetermined visual appearance in the stone slab 50. In another example embodiment, gold, silver, bronze, or copper leaf may be applied as at least a portion of the pigmented layer 120.

Surface 112 may be prepared for subsequent application of an additional material before additional material is distributed onto surface 112. For example, surface 112 may be a compacted and/or smoothed surface in an uncured or Wet' state. The compacted and/or smoothed surface can facilitate application of subsequent material (e.g., pigment, particulate mineral mix, etc.) onto the surface 112. For example, the compacted and/or smoothed surface 112 may facilitate delivery of subsequent material in a controlled, predictable manner, and may provide a surface suitable for manual application of a pigmented material, such as manually painting the surface 112. Alternatively or additionally, the surface 112 may be prepared such that the surface 112 does not require substantial further compaction or shifting of the particulate mineral material during additional processing operations. Such surface preparation may limit the distortion that the pigmented material (e.g., applied to create a visible image) may otherwise be subjected to if applied to an unprepared surface (e.g., a rough surface of particulate mineral mix loosely poured into a mold).

Figure 2F:
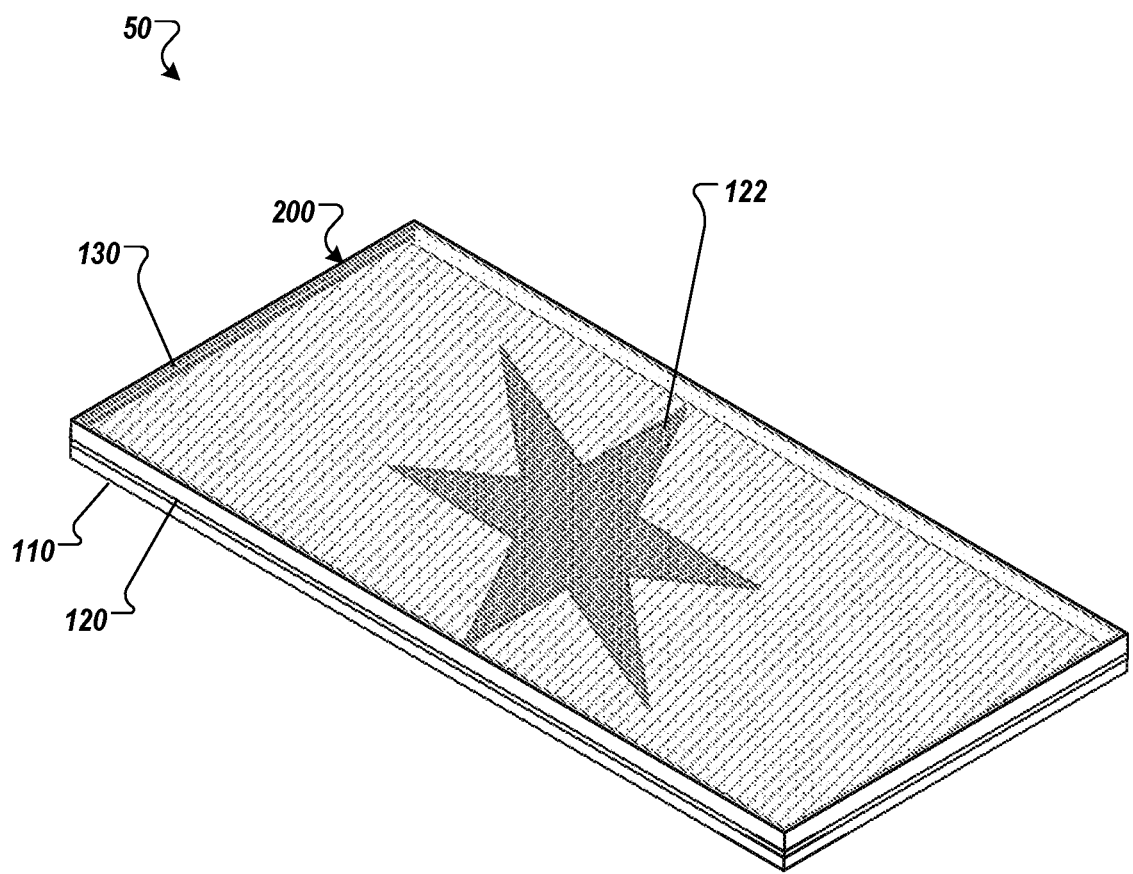
FIG. 2F is a perspective view of a stone slab mold that includes multiple material layers.

FIG. 2F shows a perspective view of the layers used to form stone slab 50 within the slab mold 200. The bottom layer 110, the pigmented layer 120, and the top layer 130 are positioned within the mold 200, and subjected to subsequent processing operations to cure and harden the layers into a stone slab. The finished stone slab 50 includes an aesthetic appearance in which the predetermined pattern 122 is at least partially visible through the bottom layer 110 and/or the top layer 130. The stone slab 50 can be cut, milled, machined, or otherwise processed to various shapes and sizes (e.g., to provide custom-fit countertop surfaces with optional holes for sinks, faucets, or other amenities, shower surrounds, tiles, etc.).

Figure 3:
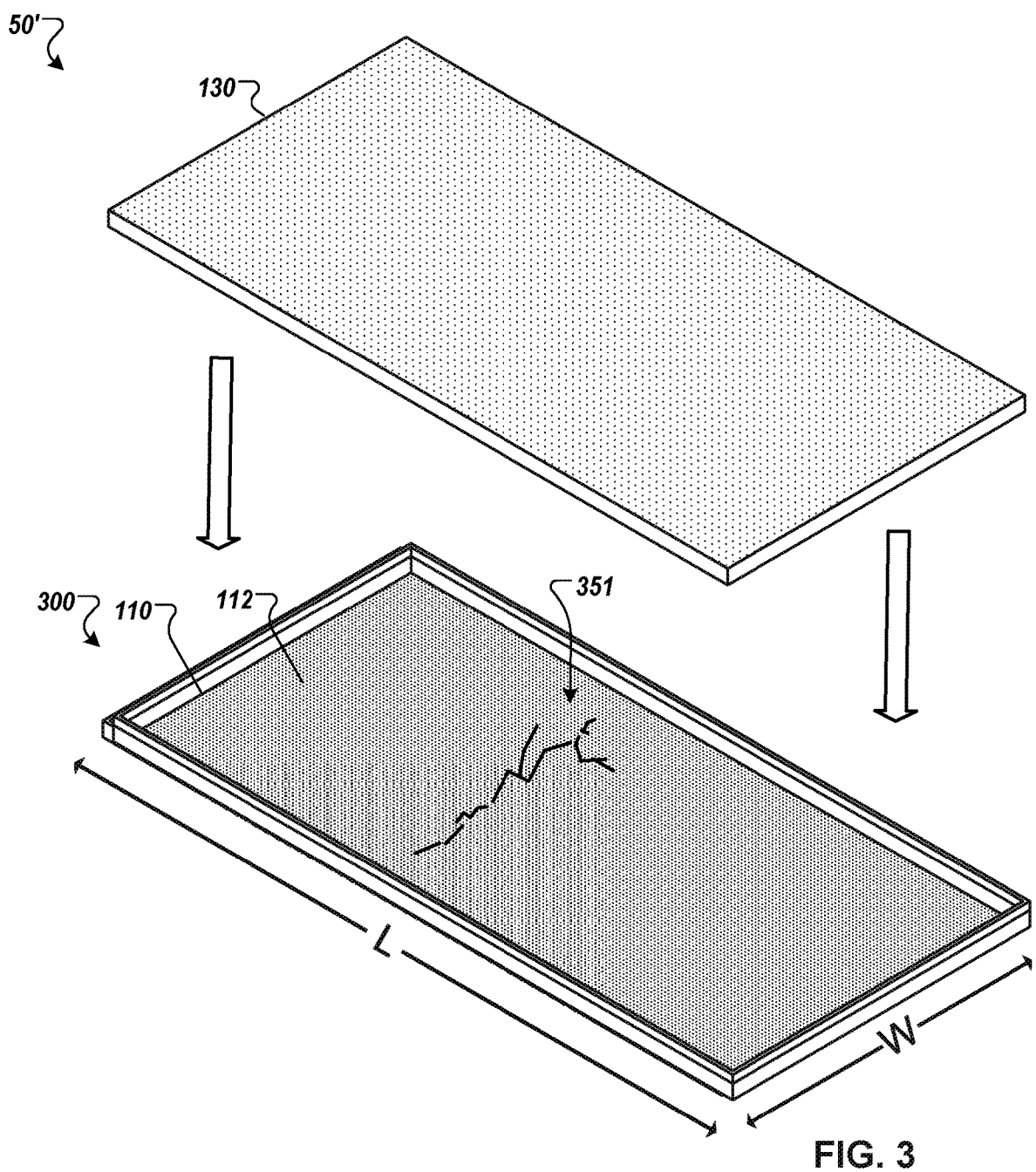
FIG. 3 is an exploded view of a stone slab mold that includes a material within the mold having a void, and an additional material applied to at least portions of the void.

Referring to FIG. 3, a perspective view of an example process for preparing a material layer for receiving a subsequent distribution of material. In some embodiments, an example processed slab can be formed to enhance an aesthetic effect of a veined appearance. The aesthetic effect may include veins 351 that extend partly or fully across a complete length L and/or partly or fully across a complete width W of the stone slab 50 (e.g., at least 3 feet wide by at least 6 feet long, and between about 3 feet and 6 feet wide and between about 6 feet and 12 feet long, between about 4.5 feet and 5.5 feet wide and between about 10 feet and 11 feet long, and preferably a size selected from one of about 4.5 feet wide by about 10 feet long or about 5.5 feet wide by about 11 feet long). In some embodiments, example pigmented veins do not extend through the entire thickness of the slab (e.g., do not extend through the entire thickness of the bottom layer 110). In an example embodiment, preparation of the material layer includes at least partly compacting and/or smoothing the surface.

The partial, uncured slab 300 includes a bottom layer 110 formed of one or more particulate mineral mixes distributed into the mold 200. The particulate material mixes of the bottom layer 110 may partially fill the mold 200 such that additional particulate material mixes may be subsequently distributed into the mold over the entire bottom layer 110. Alternatively, the material of bottom layer 110 may have sufficient depth to define the entire thickness of the resulting stone slab 50 (e.g., without a need to add additional particulate mineral mixes over the entire bottom layer 110 to achieve a stone slab having a desired thickness). In some embodiments, slab pieces (e.g., recycled parts of previously manufactured slabs) can be included in the used in the slab 300, and the bottom layer 110 may be used as a fill between the slab pieces such that the slab pieces and the fill have substantially the same thickness.

In an example embodiment, the bottom layer 110 is prepared, and then additional material is distributed onto at least a portion of the bottom layer 110. For example, the bottom layer 110 within the mold 200 may be rolled, tamped, compressed, or otherwise at least partly compacted and/or smoothed to form the surface 112. Such operations prepares surface 112 to receive distribution of one or more materials.

Material subsequently distributed into the mold 200 may at least partly fill channels, discontinuities, and/or other voids in the material within the mold 200. For example, pigmented materials (e.g., dye, paint, colored particulate mineral mix,) can be deposited onto bottom layer 110 such that the pigmented materials, and resulting visual pigmentation, is concentrated in such voids. Voids in the previously distributed material within the mold thus facilitate controlled application of pigmented materials that can yield a veined aesthetic appearance, and in some embodiments, a predetermined veined appearance due to the concentrated locations of pigmented material (e.g., even if the pigmented material is applied across the entire surface 112).

In some embodiments, one or more dispensers can be configured to dispense a pigment powder material (e.g., a pigmented material that does not include predominantly quartz or silica material, or little or no quartz or silica material). In some embodiments, the pigment powder can include one or more metals such as stainless steel, gold, copper, silicon, carbon fiber, or combinations of these and/or any other appropriate pigment material. Alternatively or additionally, one or more dispensers can be configured to dispense a particulate mineral mix (e.g., including a quartz or silica material, such as a particulate mineral mix that includes predominantly quartz or silica material) having pigments that are different from the mixes of the bottom layer 110. In some embodiments, the pigment powder material (or other material) dispensed from the dispenser can be deposited along a major (exposed) side of the mold 200 so that at least a portion of the material penetrates at least slightly into the thickness of the bottom layer (e.g., into the voids formed in the surface 112). A resulting pattern remains viewable even after compaction and polishing of the slab. The veins may extend partly or entirely through the full thickness of the hardened bottom layer 110.

Alternatively or additionally, channels or voids in surface 112 can be formed using one or more techniques. For example, a stencil having a predetermined pattern of channels or voids can be pressed into the surface 112 (e.g., like a 'cookie cutter' or stamp). In another example, channels or voids can be engraved into the surface 112 manually or using an automatically controlled tool (e.g., robotic device, scribe, water jet, laser engraver, pneumatic jet).

In some example embodiments, the mold 200 including the bottom layer 110 and additional pigmented material may advance to subsequent processing operations (e.g., vibro-compaction, curing, polishing) to form a stone slab. Alternatively or additionally, one or more additional material layers may be distributed over surface 112 of bottom layer 110 and/or the pigmented material. Referring now to FIG. 3B, a top layer 130 is deposited or otherwise applied to the partial, uncured slab 300. The mold 200 is then advanced to subsequent processing operations for forming the stone slab 50.

Similar to the materials described above with reference to FIGS. 1-2E, one or more of the mixes that are used to form the composite stone material can include organic polymer(s) and an inorganic (mineral) particulate component(s). The inorganic (mineral) particulate component may include such components as silicon, basalt, glass, diamond, rocks, pebbles, shells, silica, a variety of quartz containing materials, such as, for example, but not limited to: crushed quartz, sand, quartz particles, and the like, or any combination thereof. In an example embodiment, all of the different particulate mineral mixes each comprise a quartz material as a predominant component, which may include sand of various particle sizes and of different combinations. In the stone slab 50, the organic and inorganic materials can be linked using a binder, which may include for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. Some or all of the mixes dispensed in the mold may include components that are combined in a mixing apparatus (not shown) prior to being conveyed to the mold. The mixing apparatus can be used to blend raw material (such as the quartz material, organic polymers, unsaturated polymers, and the like) at various ratios. In various example embodiments, the bottom layer 110, the pigmented material layer, and the top layer 130, may include about 8%-95%, 25%-95%, or about 75-95% quartz aggregates, and about 3%-50%, 5%-25%, or about 5%-15% polymer resins. In addition, various additives, may be added to the raw materials in the mixing apparatus, such additives may include, metallic pieces (e.g., copper flecks or the like), colorants, dyes, pigments, chemical reagents, antimicrobial substances, fungicidal agents, and the like, or any combination thereof.

Figure 4:
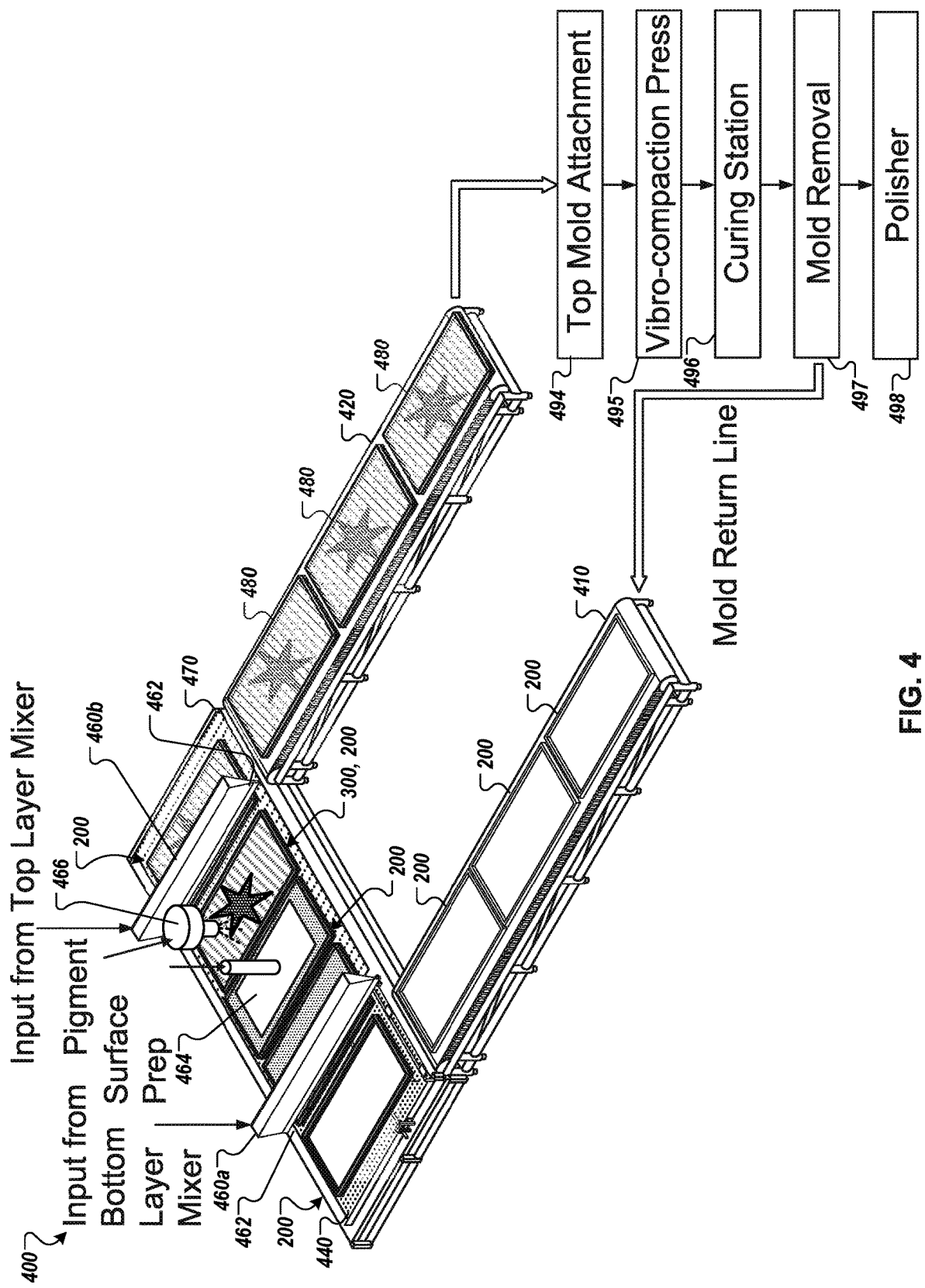
FIG. 4 is a diagram of an example system that can be used to form a stone slab product.

Referring now to FIG. 4, a system 400 for forming a set of stone slab products (e.g., stone slab 50 (FIG. 1), stone slab 50 (FIG. 5), etc.) is shown. The system 400 may be configured to sequentially dispense particulate mineral mixes and pigmented materials into a horizontally oriented mold. The contents of the mold are then processed in a subsequent compression molding operation (e.g., vibro-compaction molding, curing, etc.). The system 400 includes an input conveyor 410 and an output conveyor 420. A collection of slab molds 200 are transported on the input conveyor 410 and the output conveyor 420 between various operations in a process of manufacturing the stone slab products. The slab molds 200 provide a form for stone slab products, and in various example embodiments may define a mold cavity having a width between about 3 feet and 18 feet, or between about 4.5 feet and 7 feet, and a length L that is at least 6 feet, and between about 6 feet and 24 feet, or between about 10 feet and 12 feet, and a thickness that is at least 1 cm, between about 2.5 cm and 25 cm, or about 7.5 cm. The input conveyor 410 may transport the slab molds 200 to an air table 440. The air table 440 includes a collection of outlets formed on a top surface. Air pumped through the outlets forms a cushion of air between the top surface and the slab molds 200, to facilitate movement and/or orientation of the slab molds 200.

Still referring to FIG. 4, the system 400 also includes a collection of mineral aggregate distributors 460*a*, 460*b*, an optional surface preparation device 464, and an optional pigment dispenser 466. In an example embodiment, each of the distributors 460*a*, 460*b* is dedicated to dispensing a corresponding particulate mineral mix. Alternatively or additionally, other dispensers may be employed, including dispensers 460*a*, 460*b* that dispense multiple different particulate mineral mixes, etc. The slab mold 200 is moved substantially horizontally (e.g., relative to gravity) beneath the distributor 460*a*, at least partly filling the slab mold 200 with a first particulate mineral mix (e.g., to form the bottom layer 110). In an example embodiment, the slab mold 200 is partly filled with the first particulate mineral mix such that the first particulate mineral mix entirely covers a bottom surface of the slab mold 200.

The slab mold 200 is moved horizontally (e.g., relative to gravity) to the surface preparation device 464. The surface preparation device 464 is configured to form an at least partly compacted and/or smoother surface of the contents of the partly filled slab mold 200 (e.g., to form a compacted/smooth surface 112 on the bottom layer 110). Alternatively or additionally, various operations of forming the stone slab may occur in other orientation(s), such as vertically and/or angled relative to gravity, and/or the slab mold 200 may be moved between two or more orientations during the process of forming the stone slab. Surface preparation device 464 may include various operations to compact and/or smooth the material in slab mold 200. For example, surface preparation device 464 may include a press to compact (e.g., tamp) and/or smooth the material in the slab mold 200. The surface preparation device 464 may include a roller, which may be rolled across the slab mold 200 to compact and/or smooth the material in the slab mold 200. Alternatively or additionally, surface preparation device 464 may include vacuum-forming or hydro-forming operations, in which a compliant bladder or membrane to/from which a liquid is filled or evacuated to apply a substantially uniform smoothing and compacting force to the material in the slab mold 200. In some example embodiments, surface preparation device 464 may impart a substantially planar surface. Alternatively or additionally, surface preparation device 464 may impart a surface that includes at least some locations that are substantially non-planar. For example, surface preparation device 464 may impart 'hills' or a wavy surface (e.g., such that the thickness varies at different locations within the mold 200.

Operation of surface preparation device 464 results in an at least partially filled slab mold 200 in which the material is uncured or 'wet', and has a compacted and/or smoothed surface. The compacted and/or smoothed surface can facilitate application of subsequent material (e.g., pigment, particulate mineral mix, etc.) onto the surface. For example, the surface preparation device 464 may generate a surface that facilitates delivery of subsequent material in a controlled, predictable manner. In some embodiments, the surface preparation device 464 generates surface characteristics suitable for manual application of a pigmented material, such as manually painting the surface. Alternatively or additionally, the surface preparation device 464 may sufficiently compact and/or smooth the material within the slab mold 200 such that the surface does not require substantial further compaction or shifting of the particulate mineral material during subsequent processing operations. Such surface preparation may limit the distortion of a pigment (e.g., applied to create a visible image) that the pigment may otherwise be subjected to if applied to an unprepared surface (e.g., a rough surface of particulate mineral mix loosely poured into a mold).

After operation of surface preparation device 464, the slab mold 200 may be moved (e.g., horizontally relative to gravity) to the pigmented material dispenser 466. The pigmented material dispenser 466 is configured to apply one or more pigmented substances onto the smoothed surface of the first particulate mineral mix within the slab mold 200. In various example embodiments, the pigmented material dispenser 466 may include a liquid sprayer, a powder dispenser, an industrial printer (e.g., inkjet), a thermal printer (e.g., laser engraver), a film applicator (e.g., layering a pre-patterned film or membrane), a human painter or artist, mineral aggregate distributors (e.g., similar to mineral aggregate distributors 460a, 460b), combinations thereof, etc. such that predetermined patterns of pigmented material may be distributed into the slab mold 200.

The slab mold 200 is moved horizontally (e.g., relative to gravity) to the distributor 460b, partly filling the slab mold 200 with a second particulate mineral mix (e.g., to form a top layer 130). In an example embodiment, the second particulate mineral mix is a material that is at least partially transparent or translucent when fully processed/cured into the stone slab. For example, the second particulate mineral mix may be formed of a predominately quartz particulate mineral mix and include at least partially transparent particles that allow the pigmented material to be visible through the second particulate mineral mix. The second particulate mineral mix may have an opaque and/or white appearance when dispensed from distributor 460b and in an uncured or Wet' state. The second particulate mineral mix may thus substantially obscure or otherwise render the pigmented material not visible or only slightly visible when initially distributed onto the pigmented material. The second particulate mineral mix may transition from opaque to transparent/translucent during one or more curing operations such that the pigmented material becomes readily visible through the second particulate mineral mix in the stone slab. Alternatively or additionally, the distributor 460b can be configured to dispense a resin or other material other than a particulate mineral mix into the mold 200 as the top layer. For example, the distributor 460b may dispense a primarily resin material or other material (e.g., that is not a particulate mineral mix or that includes little or no particulate material).

In this embodiment, each of the mineral aggregate distributors 460a, 460b includes a dispensing head 462. In use, the dispensing heads 462 each receive a corresponding particulate mineral mix from a mixer line (not shown), such that each dispenser head 462 is configured to release a different particulate mineral mix (e.g., different pigments, different mineral compositions, different additives, or a combination thereof) compared to the other dispenser heads 462. Each dispenser head 462 is configured to controllably dispense its supply of corresponding particulate mineral mix into the slab molds 200. For example, the dispensing heads 462 are each configured with a shutter or valve apparatus (not shown) that is controllable to regulate the flow of particulate mineral mix from the dispensing head 462 to the slab mold 200. The dispensing heads 462 are controllable to dispense material into the slab molds 200 at a substantially repeatable rate.

In an example embodiment, system 400 includes two distributors 460a, 460b are used. In various example embodiments, system 400 includes between 2 and 20 different particulate mineral mixes and pigmented materials, or between 2 and 8 different particulate mineral mixes and pigmented materials, and/or may include a corresponding number of distributors for dispensing each of the particulate mineral mixes and pigmented materials into the slab mold 200. In some examples, the number of distributors can correspond equally to the number of materials used to create the stone slab.

In various embodiments, the pigmented material dispenser 466 can be configured to dispense a particulate mineral mix (e.g., including predominantly quartz material) having an aesthetic appearance visibly different than the materials that form top and bottom layers of the stone slab. Alternatively or additionally, a pigment powder material (or other material) dispensed from the pigment dispenser 466 can be deposited into the mold 200 so that at least a portion of the material penetrates at least slightly into the thickness of the prepared surface (e.g., onto a compacted and/or smoothed surface, into one or more voids defined in the surface, etc.). Distribution into voids of the prepared surface can facilitate the appearance of striations or veins in the stone slab, and facilitate visibility of the veins after compaction, polishing, and/or other operations. In an example embodiment, such veins extend partially through a thickness of the stone slab, and do not extent through the entire thickness such that the veins are visible from a top surface and/or a bottom surface. The differences in visible appearance between the pigmented material dispensed into voids of the surface, and the other materials dispensed into the slab mold 200 can contribute to a veined appearance, or other predetermined appearance.

After the slab mold 200 has been sufficiently filled, the slab mold 200 (now a filled mold 480) is moved on a cushion of air provided by an air table 470, to an output conveyor 420. The successive layers of different particulate mineral mixes that were dispensed into the mold 200 are generally noticeable in the filled molds 480 and are arranged in the horizontal orientation on the output conveyer 420 (e.g., as shown in FIGS. 1 and 2F). Some or all of these successive complementary patterns of different particulate mineral mixes can form the predetermined pattern 122 and/or veins 351 of the hardened slab (e.g., the stone slab 50 (FIG. 1), the stone slab 50 (FIG. 3), etc.).

The system 400 optionally includes another station between the aggregate distributor 460a and the aggregate distributor 460b. For example, an engraving station may be included to engrave or otherwise modify the smoothed surface of the first particulate mix to generate one or more voids in the surface before the second particulate mix is applied (e.g., as discussed previously with reference to FIG. 3). Engraving station may be included as part of surface preparation device 464, or in one or more subsequent stations.

Still referring to FIG. 4, the output conveyor 420 can be configured to transport each of the filled molds 480 to one or more sequent stations in the system 400 for forming the hardened slab. For example, each of the filled molds 480 can continue to a subsequent station in which a top mold attachment 494 is positioned over the filled mold 480 so as to encase the layers of particular mineral mixes between the mold 200 and a top cover mold piece (not shown in FIG. 4). From there, the filled mold 480 (now including the top cover mold piece) continues to a subsequent station in which a vibro-compaction press 495 applies compaction pressure, vibration, and vacuum to the contents inside the filled mold 480, thereby converting the particulate mixes into a rigid slab. After the vibro-compaction operation, the filled mold 480 (with the compacted and hardened slab therein) proceeds to a curing station 496 in which the material used to form the slab (including any resin binder material) are cured via a heating process, thereby further strengthening the slab inside the filled mold 480. After the slab is fully cured (and cooled), the primary mold 200 and the top mold cover piece are removed from the hardened and cured slab at a mold removal station 497. The primary mold 200 is then returned to the input conveyor 410. Then, the hardened and cured slab is moved to a polisher station 498, in which a major surface of the slab is polished to a smooth finish, thereby providing an appearance of the visible imagery, striations, veining patterns provided by pigmented materials of the stone slab. In some embodiments, the slab can be partly removed at polisher station 498 by polishing, cutting, or planing such that the pigmented layer is partly exposed (e.g., the pigmented layer touches or penetrates the top layer). The polished major surface of each of the stone slabs provides an outer appearance in which the visible imagery, striations, and/or veining patterns are at least partly visible, and in some embodiments appear to be 'captured' or 'floating' between one or more layers of the stone slab.

In some embodiments, substantial portions of the hardened and cured slab may be removed (e.g., by polisher station 498) to provide a particular aesthetic appearance and/or dimensions. For example, an entire top portion of the hardened and cured slab may be removed by cutting through the thickness between major faces of the slab. In an example embodiment, only a top material may be visible prior to the cut, while multiple material layers may be visible at different locations on the top major face after the cut. In this way, multiple material layers located at different depths across the stone slab may be exposed to provide a particular aesthetic appearance.

Figure 5:
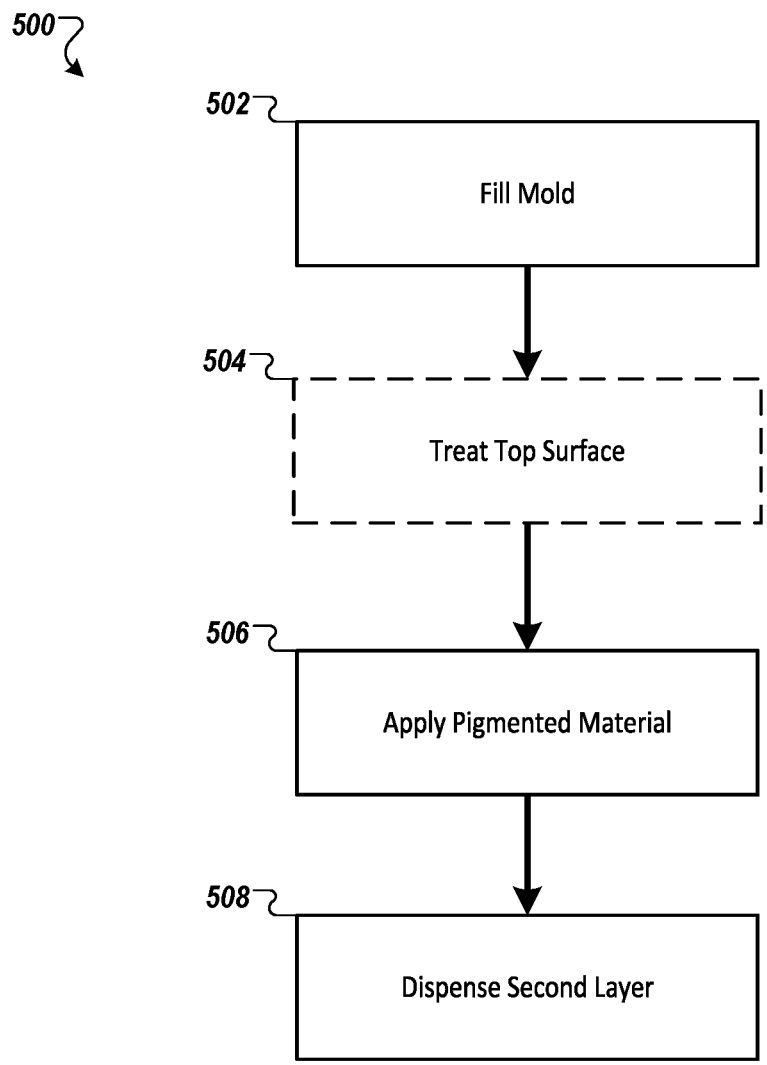
FIG. 5 is a flow diagram of an example process for forming a stone slab product.

FIG. 5 is a flow diagram of an example process 500 for forming a stone slab product (such as stone slab 50, stone slab 50', etc.). In some implementations, the system 400 of FIG. 4 can be used to perform the process 500. The process 500 may include the operation 502 of partially filling a mold with particulate mineral mix, thereby creating a first layer of particulate mineral mix. In such an operation, the slab mold may be partly filled with a particulate mineral mix to form a bottom layer that entirely covers a bottom of the slab mold. The process 500 may also include optional operation 504 of preparing a surface of the particulate mineral mix. In some example embodiments, operation 504 includes rolling, tamping, compressing, or otherwise at least partly compacting and/or smoothing an uncured particulate mineral mix. Operation 504 may generate a compacted and/or smoothed exposed surface of the uncured or 'wet' material. The prepared surface may facilitate delivery of subsequent material in a controlled, predictable manner.

After preparation of the surface, one or more additional materials may be distributed into the mold, such as one or more pigmented materials, particulate mineral mixes, etc. For example, the process 500 may include the operation 506 of applying a pigmented substance to the prepared top surface of the first layer. For example, the pigmented layer 120 can be applied to the uncured surface via a sprayer, a powder dispenser, an industrial printer (e.g., using inkjet techniques), a film applicator (e.g., layering a pre-patterned film or membrane), a human painter or artist, mineral aggregate distributors (e.g., similar to mineral aggregate distributors 460a, 460b), combinations thereof, etc.

The process 500 may optionally include one or more operations 508 of dispensing second or subsequent layers of material into the mold (e.g., over the applied pigmented material). The second and/or subsequent particulate mineral mixes may be at least partially transparent or translucent when fully processed/cured into the stone slab. For example, the second particulate mineral mix may be formed of a predominately quartz particulate mineral mix and include at least partially transparent particles that allow the pigmented material to be visible through the second particulate mineral mix. Alternatively or additionally, the second or subsequent layers may include a resin or other material other than a particulate mineral mix.

In some implementations, the layers may be deposited in a different order. For example, in some implementations, the layer that would provide the front, visible face in use could be deposited first, and the layer that would form the rear of the slab could be deposited last. Alternatively, the layer that would provide the rear face in use could be deposited first, and the layer that would form the front of the slab could be deposited last. In some embodiments, the slab can also include other materials or layers that reinforce and/or strengthen the composite slab, such as a functional mesh layer, paper, wood, plastic, composite materials, or any other appropriate materials that can reinforce or strengthen the composite slab.

While this specification contains many specific implementation details, these should not be construed as limitations on the scope of any technology described herein or of what may be claimed, but rather as descriptions of features that may be specific to particular embodiments. Certain features that are described in this specification in the context of separate embodiments can also be implemented in combination in a single embodiment in part or in whole. Conversely, various features that are described in the context of a single embodiment can also be implemented in multiple embodiments separately or in any subcombination. Moreover, although features may be described herein as acting in certain combinations and/or initially claimed as such, one or more features from a claimed combination can in some cases be excised separate from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A process of forming a stone slab, comprising:
  partially filling a mold with a particulate mineral mix to create a first layer of particulate mineral mix in the mold;
  preparing a top surface of the first layer of the particulate mineral mix for subsequent application of material to the top surface;
  applying a pigmented substance to the top surface of the first layer; and
  dispensing a second layer of particulate mineral mix into the mold over the applied pigmented substance.

2. The process of claim 1, wherein preparing the top surface of the first layer comprises at least partially smoothing the top surface.

3. The process of claim 2, wherein smoothing the top surface comprises pressing the top surface.

4. The process of claim 2, wherein the pigmented substance is applied to the top surface of the first layer while the first layer is in an uncured state.

5. The process of claim 4, wherein the second layer of the particulate mineral mix is dispensed while the first layer is in an uncured state.

6. The process of claim 2, wherein the pigmented substance is applied to provide an appearance of a predefined image.

7. The process of claim 1, wherein partially filling a mold with particulate mineral mix to create a first layer comprises entirely covering a bottom surface of the mold with the particulate mineral mix.

8. The process of claim 1, wherein the second layer is at least partly transparent or translucent when cured.

9. The process of claim 1, wherein the first layer is at least partly transparent or translucent when cured.

10. The process of claim 1, wherein the first layer comprises a first particulate mineral mix and the pigmented substance comprises a second particulate mineral mix, and the first particulate mineral mix is different than the second particulate mineral mix.

11. The process of claim 9, wherein the first layer comprises a first particulate mineral mix and the second layer comprises a second particulate mineral mix, and the first particulate mineral mix is different than the second particulate mineral mix.

12. A processed slab formed according to the process of claim 1.

13. The method of claim 1, wherein the pigmented material does not include a particulate mineral mix.

14. The method of claim 1, wherein a thickness of the pigmented layer is less than 10% of a thickness of the top layer.

15. The method claim 14, wherein the first layer is a bottom layer, the second layer is a middle layer, and the third layer is a top layer.

16. The method of claim 6, wherein the predefined image is selected from the group consisting of a word or logo.

17. The method of claim 1, wherein the pigmented layer does not form a portion of an exposed surface of the stone slab.

18. The method of claim 1, wherein the first layer of particulate mineral mix at least partially contacts the second layer of particulate mineral mix.

19. The method of claim 18, wherein the first layer comprises a first particulate mineral mix and the second layer comprises a second particulate mineral mix, and the first particulate mineral mix is different than the second particulate mineral mix.

20. The method of claim 1, wherein the first layer of particulate mineral mix is spaced apart from the second layer of particulate mineral mix such that the first layer of particulate mineral mix does not contact the second layer of particulate mineral mix.

21. The process of claim 20, wherein preparing the top surface of the first layer comprises at least partially smoothing the top surface, wherein the pigmented substance is applied to provide an appearance of a predefined image and is applied to the top surface of the first layer while the first layer is in an uncured state, and wherein the first layer is at least partially transparent.

22. The process of claim 21, wherein the first layer comprises a first particulate mineral mix and the second layer comprises a second particulate mineral mix, and the first particulate mineral mix is different than the second particulate mineral mix.

* * * * *